US010399595B2

(12) United States Patent
Moretti et al.

(10) Patent No.: US 10,399,595 B2
(45) Date of Patent: Sep. 3, 2019

(54) MIXED STEERING ASSISTANCE COMPRISING A TORQUE CONTROL LOOP SETPOINT-PILOTED BY A POSITION CONTROLLER INTENDED FOR PATH CONTROL

(71) Applicant: JTEKT EUROPE, Irigny (FR)

(72) Inventors: Romain Moretti, Soucieu en Jarrest (FR); Luc Leydier, Oullins (FR)

(73) Assignee: JTEKT EUROPE, Irigny (FR)

(*) Notice: Subject to any disclaimer, the term of this patent is extended or adjusted under 35 U.S.C. 154(b) by 83 days.

(21) Appl. No.: 15/317,153

(22) PCT Filed: Jun. 19, 2015

(86) PCT No.: PCT/FR2015/051626
§ 371 (c)(1),
(2) Date: Dec. 8, 2016

(87) PCT Pub. No.: WO2015/197951
PCT Pub. Date: Dec. 30, 2015

(65) Prior Publication Data
US 2017/0106903 A1    Apr. 20, 2017

(30) Foreign Application Priority Data
Jun. 24, 2014 (FR) ..................... 14 55841

(51) Int. Cl.
B62D 6/00 (2006.01)
B62D 1/28 (2006.01)
(Continued)

(52) U.S. Cl.
CPC ............ B62D 6/00 (2013.01); B62D 1/28 (2013.01); B62D 1/286 (2013.01); B62D 5/0463 (2013.01);
(Continued)

(58) Field of Classification Search
CPC .... B62D 6/00; B62D 15/025; B62D 15/0285; B62D 1/28; B62D 1/286; B62D 5/0463; B62D 5/0472
See application file for complete search history.

(56) References Cited

U.S. PATENT DOCUMENTS 5,631,833 A * 5/1997 Wada ................... B62D 5/0463
180/446
5,925,082 A * 7/1999 Shimizu ................... B62D 6/00
180/272
(Continued)

FOREIGN PATENT DOCUMENTS

EP    0567991 A2    11/1993
JP    H11-78948 A    3/1999

OTHER PUBLICATIONS

Asanuma et al., JPH1178948, Mar. 23, 1999 (machine translation).*
Nov. 9, 2015 International Search Report issued in International Patent Application No. PCT/FR2015/051626.

Primary Examiner — Courtney D Heinle
(74) Attorney, Agent, or Firm — Oliff PLC

(57) ABSTRACT

A method for managing a power steering system including at least one steering wheel and at least one assist motor, the method including a step of driver torque control, which involves evaluating a driver torque difference that corresponds to the difference between a predefined driver torque setpoint and the actual driver torque actually exerted by the driver on the steering wheel, then determining an engine torque setpoint for torque applied to the assist motor in order to reduce the driver torque difference, the driver torque setpoint being generated during a trajectory control step, which involves evaluating a trajectory difference, for example a position difference, which corresponds to the difference between a trajectory setpoint, of the position setpoint type, which depends on a reference trajectory, and
(Continued)

the actual trajectory of the vehicle, given by the measured position of the power steering, then determining, from the trajectory difference, a driver torque setpoint intended to reduce the trajectory difference.

10 Claims, 1 Drawing Sheet

(51) Int. Cl.
  *B62D 5/04* (2006.01)
  *B62D 15/02* (2006.01)
(52) U.S. Cl.
  CPC ......... *B62D 5/0472* (2013.01); *B62D 15/025* (2013.01); *B62D 15/0285* (2013.01)

(56) References Cited

U.S. PATENT DOCUMENTS

| | | | | |
|---|---|---|---|---|
| 6,324,452 | B1* | 11/2001 | Ikegaya | B62D 1/286 |
| | | | | 180/422 |
| 2012/0185132 | A1* | 7/2012 | Kezobo | B62D 5/0472 |
| | | | | 701/41 |
| 2013/0060413 | A1* | 3/2013 | Lee | B62D 1/286 |
| | | | | 701/23 |
| 2013/0060414 | A1* | 3/2013 | Lee | B62D 1/286 |
| | | | | 701/23 |
| 2014/0277945 | A1* | 9/2014 | Chandy | B62D 6/00 |
| | | | | 701/42 |
| 2017/0015348 | A1* | 1/2017 | Sasaki | B62D 5/0484 |

* cited by examiner

MIXED STEERING ASSISTANCE COMPRISING A TORQUE CONTROL LOOP SETPOINT-PILOTED BY A POSITION CONTROLLER INTENDED FOR PATH CONTROL

The present invention concerns the methods intended for the management of power steering equipping vehicles, and in particular motor vehicles.

More particularly, the present invention concerns the methods for managing power steering where coexist, on the one hand, conventional steering wheel maneuver assist functions, intended typically to provide, by means of an assist motor, an assist torque which amplifies the torque exerted manually by the driver on the steering wheel in order to relieve the driver during the steering maneuvers and, on the other hand, drive assist functions (automatic piloting functions), such as the parking assist functions, which automatically control the vehicle path.

The drive assist functions of the automatic piloting type, such as the parking assistance («city park») or the assistance for keeping the vehicle in the traffic lane thereof («lane keeping») tend to multiply, in order to improve safety and comfort of the users of motor vehicles.

However, their integration is not without raising some difficulties, to the extent that, by nature, these automatic piloting functions act in an autonomous manner, by controlling by themselves the steering configuration which makes it possible to follow a reference path determined from said automatic piloting functions, thereby frequently bringing said functions to oppose any maneuver of manual origin (related to an intervention of the driver), and consequently, to oppose the conventional maneuver assist functions which obey the actions of the driver.

Thus, it will be easily understood, for example, that if a function of assistance for keeping the vehicle in the path thereof tends to return the vehicle to the right, whereas, simultaneously, the driver desires to change lane or to fork by pulling the steering wheel to the left, the two types of action will oppose each other, to the detriment of the maneuver comfort, or even to the detriment of safety of the occupants of the vehicle.

A compromise may consist in letting the automatic piloting functions and the assist function act simultaneously, each defining respectively its own assist motor piloting setpoint, and then in summing said setpoints, that is to say summing the respective contributions of each of said functions, so as to define a global setpoint which will be then applied to the assist motor.

Nonetheless, such a compromise has the drawback of systematically generating an "average" setpoint, which permanently opposes contributions derived from antinomic functions.

This tends to generally deteriorate the individual performances of all said functions, in particular by preventing either one of said functions from fully expressing itself, without being disturbed by the other function, and this even when the vehicle is punctually in a life situation which could be entirely managed, in an optimum manner, by only one function acting individually.

According to another possibility, it is possible to consider activating (or, respectively, inhibiting) selectively the maneuver assist function or the automatic piloting function, depending on the life situation of the vehicle.

Therefore, the difficulty lies, on the one hand, in detecting the life situation of the vehicle and, on the other hand, in ensuring, in the case of a change of the life situation, an adequate transition between a management by the automatic piloting function and a management by the manual maneuver assist function (or vice versa).

Indeed, such transitions have the potential to generate instabilities, which instabilities may be detrimental to the maneuver comfort or even to the behavior of the vehicle, and therefore to the safety of the occupants of said vehicle or to other road users.

Moreover, the steering management is further complicated by the necessity to take into consideration the released (hands off) or held state (hands on) of the steering wheel, in particular in order not to risk causing a torsion of the wrist or of the arm of the driver under the effect of a too powerful automatic piloting, when the driver holds the steering wheel firmly (that is to say in a «held steering wheel» situation).

Consequently, the objects assigned to the invention aim to overcome the aforementioned drawbacks, and to propose a new method for managing power steering which allows combining the maneuver assist functions and the automatic piloting functions for the driving assistance, and which therefore optimizes the steering assistance, in terms of comfort as well as in terms of safety, in all life situations of the vehicle.

The objects assigned to the invention are achieved by means of a method for managing a power steering comprising at least one steering wheel and at least one assist motor, said method being characterized in that it comprises a driver torque control step (b) comprising measuring the effective driver torque which is actually exerted, at the considered instant, by the driver on the steering wheel, and then comparing said effective driver torque to a predetermined driver torque setpoint in order to assess a driver torque deviation which corresponds to the difference between the effective driver torque and said driver torque setpoint, and then determining, from this driver torque deviation, a motor torque setpoint intended to be applied to the assist motor in order to reduce said driver torque deviation, and in that the driver torque setpoint which is used during the driver torque control step (b) is generated during a path control step (a) comprising measuring the effective value of at least one parameter called «path parameter» which is representative of the effective path of the vehicle, and then comparing this path parameter to a path setpoint, which is predetermined depending on a reference path that the vehicle is desired to follow automatically, in order to assess a path deviation which corresponds to the difference between said path setpoint and the effective value of the path parameter, and then determining, from this path deviation, a driver torque setpoint intended to reduce said path deviation. More particularly, the objects assigned to the invention are achieved by means of a method for managing a power steering comprising at least one steering wheel and at least one assist motor, said method being characterized in that it comprises a driver torque control step (b), comprising measuring the effective driver torque which is actually exerted, at the considered instant, by the driver on the steering wheel, and then comparing said effective driver torque to a predetermined driver torque setpoint in order to assess a driver torque deviation which corresponds to the difference between the effective driver torque and said driver torque setpoint, and then determining, from this driver torque deviation, a motor torque setpoint intended to be applied to the assist motor in order to reduce said driver torque deviation, and in that the driver torque setpoint which is used during the driver torque control step (b) is generated during a path control step (a) comprising measuring (as a path parameter) the effective position of the power steering, and then comparing this effective position to a position setpoint (forming the path setpoint), which is predetermined depending on a reference path that the vehicle is desired to follow automatically, in order to assess a position deviation (forming the path deviation) which corresponds to the difference between said position setpoint and the effective position of the steering, and then determining, from this position deviation, a driver torque setpoint intended to reduce said position deviation.

Advantageously, the invention therefore proposes a new management architecture according to which the automatic piloting function, also called «position control function», which carries out the path control, is used to define an input of the maneuver assist function (wherein said maneuver assist function is herein carried out by a driver torque control function, that is to say a control loop using the driver torque as a regulated variable), and wherein said maneuver assist function, in turn, controls the assist motor by defining (alone), the (unique) motor torque setpoint applicable to said assist motor.

In other words, the invention proposes a new architecture in which the closed loops, respectively the path control closed loops and the driver torque control closed loops, are nested in series, so that the output of the automatic piloting function (i.e. the path control function) does not interfere directly, in the form of a motor torque setpoint, with the output of the maneuver assist function (herein the driver torque control function), but is used, on the contrary, as an input, and more particularly as a setpoint, of said maneuver assist function, herein in the form of a driver torque setpoint.

Hence, this architecture in series allows effectively organizing and hierarchizing the automatic piloting function (path control function) and the maneuver assist function (driver torque control function), for instance by setting the maneuver assist function (driver torque control function) somehow "in the service" of the automatic piloting function (path control function), so that instead of opposing each other, by competing with each other or by thwarting each other, said functions collaborate, in a perfectly complementary way.

Advantageously, the proposed architecture allows maintaining the different functions, herein the path control function and the driver torque control function, simultaneously active and operational, and making them operate together, without conflict, and without necessarily having to inhibit selectively either one of said functions, nor to manage instable transitions between different operating regimes associated to these respective functions.

Thus, the stability and the performances of the steering management method are considerably enhanced.

Furthermore, such an architecture is particularly polyvalent, in particular as it allows, intrinsically and without any additional element, naturally managing the situations where the steering wheel is released as well the situations where the steering wheel is held, and more particularly smoothly managing the situations in which the driver holds the steering wheel again while the automatic piloting function is active, still without causing the deactivation of said automatic piloting function.

Indeed, in a situation where the steering wheel is released, the automatic piloting function (path control function), for example the traffic lane following function, may act freely, without encountering any manual resistance to the action of the steering wheel, and therefore may pilot the assist motor, herein indirectly, through the driver torque control function, without being thwarted by an action of the driver.

Conversely, in a situation where the steering wheel is held (or more particularly in a situation where the steering wheel is held again), a conflict (an opposition of maneuvering objectives, and therefore an opposition of forces) may arise between, on the one hand, a manual maneuver desired by the driver and, on the other hand, the automatic maneuver desired by the path control, which results in a rise of the effective driver torque, as effectively felt by the driver.

However, it will be understood that, since said effective driver torque, as effectively felt by the driver when the latter holds the steering wheel, is duly taken into consideration in the elaboration of the motor torque setpoint applied to the assist motor, then the evolutions of said driver torque, induced by the assist motor, will be gradual and in particular will not create a torque peak likely to drive, or even twist, the arm or the wrist of the driver.

Indeed, when the driver holds the steering wheel again and seeks to retain or maneuver said steering wheel against the automatic piloting, whereas said automatic piloting tends to make the same steering wheel rotate automatically in order to adapt the path of the vehicle to a reference path, the manual retaining of the steering wheel tends to make the effective position of the steering drift (move away) with respect to the position setpoint, and therefore tends to increase the position deviation (the path deviation) in input of the path control.

In order to correct this tendency, the path control loop will react by increasing the driver torque setpoint that said path control loop transmits in input of the driver torque control.

Indeed, such an increase of the driver torque setpoint aims in fine to increase (indirectly, via the driver torque control loop which pilots the assist motor) the motor torque setpoint applicable to the assist motor, and therefore to increase the return force delivered by said assist motor so as to allow bringing the steering wheel (and more generally the power steering) toward the position which corresponds to the reference path (that is to say toward the position setpoint).

Nonetheless, the retaining, by the driver, of the steering wheel against the automatic piloting movement also tends, simultaneously, to increase the effective driver torque, since said effective driver torque reflects the (measured) resulting torsion torque undergone by the steering wheel when said steering wheel is subjected to the combined, and herein opposite, action of the manual force exerted by the driver and of the motorized force induced by the path control.

This increase of the effective driver torque will be naturally reflected in input of the driver torque control.

In other words, a manual retaining of the steering wheel against the automatic piloting will simultaneously induce, on the one hand, an increase of the driver torque setpoint (determined by the path control) and, on the other hand, an increase of the effective driver torque (even if said increase of the effective driver torque is not necessarily identical to the increase of the driver torque setpoint), so that, ultimately, the driver torque deviation, as considered by the driver torque control, will not undergo any sudden variation (that is to say no high-amplitude variation within a short period of time).

Consequently, in the case of a transition from a «released steering wheel» state to a «held steering wheel» state, the motor torque setpoint, which is determined by the driver torque control depending on said driver torque deviation, will itself evolve gradually, which will allow avoiding any apparition of a motor torque peak (that is to say avoiding a high-amplitude and almost instantaneous increase of said motor torque), and therefore avoiding the apparition of a peak of the driver torque felt (undergone) by the driver.

As such, it will be noted that, if the adaptation of the motor torque setpoint over time is «gradual» to the sense that said adaptation allows preserving a gradual evolution, without strong impacts, of the intensity of the effective driver torque, as felt by the driver, the fact remains that the elementary adjustments of the driver torque setpoint and of the motor torque setpoint may be operated very rapidly (that is to say in very close time intervals), typically according to a refreshment period in the range of a few milliseconds which characterizes the response time of the control system in accordance with the invention.

In other words, although the proposed method remains gradual in its effects as felt by the driver, it remains particularly reactive, for the benefit of comfort and safety of the driver.

In the example hereinabove, holding the steering wheel against the automatic piloting may therefore result in a smooth increase of the driver torque felt by the driver through the steering wheel, which will allow the automatic piloting to transmit to said driver a tactile information which indicates to said driver the direction in which he should turn the steering wheel in order to place the vehicle in the reference path, though without this incitation to maneuver the steering wheel degenerating into a strong automatic maneuver, which would forcibly drag the wrist or the arm of the driver.

Other objects, features and advantages of the invention will appear in more detail upon reading the following description, as well as with reference to the appended drawings, provided only for an illustrative and non-restrictive purpose, among which:

The present invention concerns a method for managing a power steering 1.

In a manner known per se, said power steering 1, and more particularly the mechanism 2 of said power steering, comprises at least one steering wheel 3, allowing the driver to act on the steering in order to manually control the steering maneuver.

Figure 1:
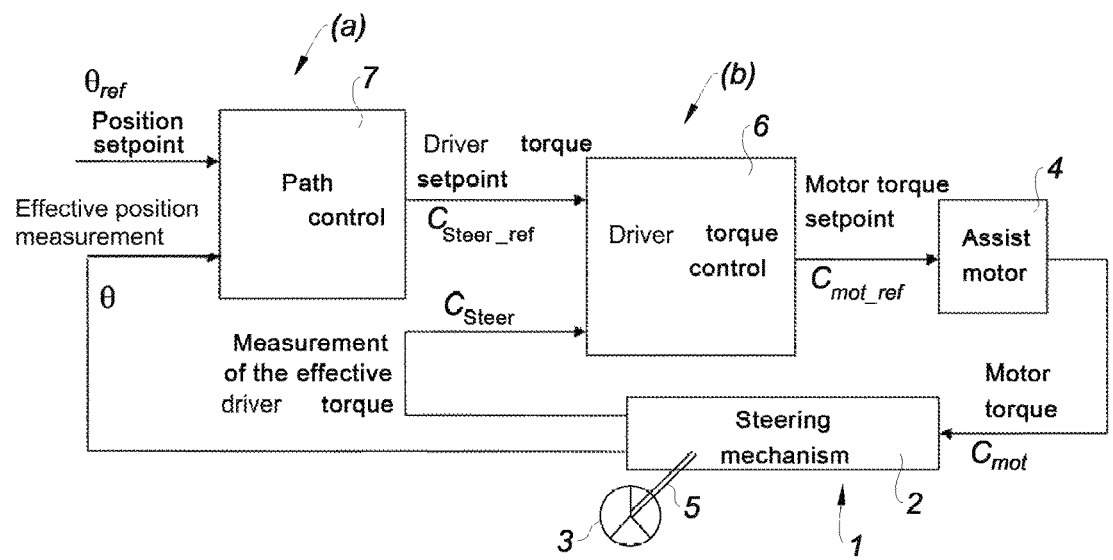
FIG. 1 illustrates, according to a block diagram, the principle of implementation of the method according to the invention.

The power steering 1 also comprises at least one assist motor 4, intended to provide a force, and more particularly a torque, for assisting the steering maneuver (noted «motor torque» $C_{mot}$ in FIG. 1).

It is possible to consider indifferently any type of assist motor 4, and more particularly any type of two-way operation assist motor, and in particular a rotating assist motor or a linear assist motor.

Moreover, said assist motor 4 may be for example hydraulic, or even, preferably, electric (the use of an electric motor facilitating in particular the implantation and the implementation of said motor, as well as the generation and the management of the useful signals).

In a particularly preferred manner, the assist motor 4 will be a rotating electric motor, for example of the «brushless» type.

Moreover, the power steering preferably comprises, in a manner known per se, a steering column 5, driven by the steering wheel 3 and which meshes, by means of a pinion, on a steering rack (not represented) slidably mounted in a steering casing secured to the chassis of the vehicle.

The ends of the steering rack are each preferably linked, via a steering tie rod, to a yaw-orientable steering knuckle, on which a steered (and preferably drive) wheel of the vehicle is mounted, so that the displacement of the rack in translation in the casing causes a modification of the steering angle (i.e. the yaw orientation) of said steered wheels.

The assist motor 4 may be engaged on the steering column 5, for example via a worm wheel and worm screw reducer, or may be engaged directly on the steering rack, by a ball screw type drive mechanism or via a motor pinion distinct from the pinion of the steering column (thereby forming a steering mechanism called «dual pinion» steering mechanism).

According to the invention, the method comprises a driver torque control step (b), herein carried out by means of a driver torque control module 6, comprising measuring the effective driver torque $C_{steer}$ which is actually exerted, at the considered instant, by the driver on the steering wheel 3, and then comparing said effective driver torque $C_{steer}$ to a predetermined driver torque setpoint $C_{steer\_ref}$ in order to assess a driver torque deviation $\Delta C_{steer}$ which corresponds to the difference between the effective driver torque and said driver torque setpoint: $\Delta C_{steer} = C_{steer} - C_{steer\_ref}$ (or, according to an opposite, but equivalent in its aims, sign convention, a driver torque deviation $\Delta C_{steer}$ which corresponds to the difference between the driver torque setpoint and the effective driver torque: $\Delta C_{steer} = C_{steer\_ref} - C_{steer}$), and then determining, from this driver torque deviation $\Delta C_{steer}$, a motor torque setpoint $C_{mot\_ref}$ intended to be applied to the assist motor 4 in order to reduce (and ideally cancel) said driver torque deviation.

In other words, the driver torque control step (b) corresponds to a follower-type closed-loop control, which uses as a regulation variable the driver torque that is applied, and therefore felt, by the driver at the steering wheel 3, and which adapts the actions exerted by the assist motor 4 on the steering mechanism 2 (that is to say, in this instance, which adapts the motor torque $C_{mot}$) so as to make the effective driver torque $C_{steer}$ converge toward the driver torque setpoint $C_{steer\_ref}$ by the effect of said actions of the assist motor 4 on the steering mechanism 2.

Thus, the determination of the motor torque setpoint $C_{mot\_ref}$ applied to the assist motor 4 enables controlling the assistance force (motor torque) $C_{mot}$ so as to make the torque, which is effectively felt by the driver by tactile perception when holding the steering wheel 3, tend toward the driver torque setpoint $C_{steer\_ref}$ which driver torque setpoint will typically correspond to the feeling which would be normally desired and expected by a driver in the dynamic situation of the vehicle at the considered instant.

Advantageously, a driver torque control provides a steering assistance which ensures a coherence between the instantaneous dynamic behavior of the vehicle (speed, lateral acceleration, yaw speed, etc.), the reactions of the road on the running gear (forces exerted on the rack, drift angle, etc.) and the force feedback (effective driver torque $C_{steer}$) perceived by the driver through the steering wheel 3.

Advantageously, such a driver torque control allows in particular uncoupling (treating separately, independently), on the one hand, the "need" (what the driver should feel), that is to say generating the driver torque setpoint $C_{steer\_ref}$ and, on the other hand, the effective "realization", that is to say implementing the driver torque closed-loop control.

Advantageously, a control by the driver torque allows perfectly realizing a "conventional" steering assistance, typically intended to reinforce, thanks to the assist torque $C_{mot}$ delivered by the assist motor 4, the action exerted by the driver on the steering wheel, and this in order to facilitate the maneuver of the steering mechanism 2 in the direction desired by the driver (the assist motor 4 cooperating in this case with the driver so as to act in the same maneuver direction).

Indeed, it will be understood that, when the driver seeks to rotate the steering wheel 3 in order to modify the steering angle, against the resistance opposed by the steering mechanism 2 (this resistance originating from the internal forces which are exerted within the mechanism 2, as well as from the forces related to the running and to the external dynamics of the vehicle), the effective driver torque $C_{steer}$ tends to increase, which results in modifying the motor torque setpoint $C_{mot\_ref}$ accordingly.

More particularly, if the increase of the effective driver torque $C_{steer}$, caused by the voluntary rotation of the steering wheel by the driver, induces an increase of the driver torque deviation $\Delta C_{steer}$, the motor torque setpoint $C_{mot\_ref}$ will also be increased, in order to raise the intensity of the assistance force $C_{mot}$ delivered by the assist motor 4 (indeed, if the effectively felt driver torque $C_{steer}$ is too high, this means that the assistance force $C_{mot}$ provided by the motor 4 is too low).

This rise of the assistance force $C_{mot}$ will thus enables maneuvering the steering mechanism 2 more easily in the direction of the target-position desired by the driver (as said target-position is defined by the position of the steering wheel).

By thus forcing the position of the steering mechanism to get closer to said target-position, by increasing the assistance force $C_{mot}$, a gradual release of the torsion undergone by the steering wheel 3 will be caused, that is to say the felt driver torque $C_{steer}$, and therefore in fine the driver torque deviation $\Delta C_{steer}$, will be reduced.

As example, it is possible to use a proportional-integral type driver torque control, in which the proportional action increases when the driver torque deviation $\Delta C_{steer}$ rises and decreases when said driver torque deviation decreases, and in which the integral action allows increasing the assistance force (motor torque) $C_{mot}$ as long as the driver torque deviation $\Delta C_{steer}$ is positive (that is to say, according to the sign convention retained above, as long as the effective driver torque $C_{steer}$ exceeds the driver torque setpoint $C_{steer\_ref}$, so that $C_{steer} = C_{steer} - C_{steer\_ref}$ is greater than zero) and decreasing said assistance force $C_{mot}$ as long as the driver torque deviation $\Delta C_{steer}$ is negative (that is to say as long as the effective driver torque remains lower than the driver torque setpoint, according to the same sign convention).

Of course, if the sign convention used to calculate the driver torque deviation was reversed, that is to say, if we had $\Delta C_{steer} = C_{steer\_ref} - C_{steer}$, all it needs is to simply reverse the sings of the gains of the proportional-integral controller accordingly so as to achieve the same result in terms of regulation.

In the aforementioned example, which corresponds to a driver torque deviation $\Delta C_{steer}$ which is positive (the driver pulls on the steering wheel so that the felt driver torque exceeds the driver torque setpoint) and decreasing (the assistance force $C_{mot}$ increases so as to enable the steering mechanism to follow the swerve given by the driver, and therefore enable the felt driver torque to decrease so as to get closer to the driver torque setpoint), the proportional action will decrease as said driver torque deviation $\Delta C_{steer}$ decreases (in absolute value), whereas the integral action continues, in turn, to increase (while gradually reducing its growth rate however, as the felt driver torque gets closer to the driver torque setpoint), so that, finally, when the deviation $\Delta C_{steer}$ decreases, the assistance force (motor torque) $C_{mot}$ increases smoothly (according to a less and less abrupt progression), until reaching, and stabilizing at, a fixed value (which allows balancing the forces exerted on the steering mechanism in the desired steering wheel position) when the deviation $\Delta C_{steer}$ becomes zero.

Of course, the effective driver torque $C_{steer}$, which may also be referred to by the expression «steering wheel torque», may be measured by any appropriate torque sensor, such as a magnetic torque sensor measuring the elastic deformations of a torsion bar placed between the steering wheel 3 and the steering column 5.

According to the invention, the driver torque setpoint $C_{steer\_ref}$ which is used during the driver torque control step (b) is generated during a path control step (a), herein carried out by means of a path control module 7, comprising measuring the effective value of at least one parameter called «path parameter» θ, which is representative of the effective path of the vehicle, and then comparing this path parameter to a path setpoint $\theta_{ref}$, which is predetermined depending on a reference path that the vehicle is desired to follow automatically, in order to assess a path deviation $\Delta\theta$ which corresponds to the difference between said path setpoint $\theta_{ref}$ and the effective value of the path parameter θ, and then determining, from this path deviation $\Delta\theta$, a driver torque setpoint $C_{steer\_ref}$ intended to reduce said path deviation, that is to say intended to make the effective path of the vehicle converge toward the reference path, so that the vehicle joins said reference path and/or substantially remains on said reference path.

In other words, the path control step (a) corresponds to a follower-type closed-loop control, which uses as a regulation variable a «path parameter», that is to say a value representative of the path followed by the vehicle (at the considered instant), and which seeks to adapt the action of the assist motor 4 on the steering mechanism 2 (in this instance, to adapt the motor torque $C_{mot}$ indirectly via the driver torque control loop) so as to make the effective value of the path parameter θ converge toward the path setpoint $\theta_{ref}$ which is set in input of said loop, and therefore, in fine, so as to make the effective path of the vehicle converge toward the reference path.

It is possible to use any appropriate parameter as a path parameter θ, that is to say as a quantity which is controlled by the path control function.

In particular, it is possible to use, as a path parameter, the position (and/or the orientation) of the vehicle in a reference frame external to the vehicle, or the yaw speed of the vehicle, or even, according to a particularly preferred possible implementation, the effective position θ of the power steering (that is to say the steering angle), in a reference frame internal to the vehicle.

Of course, the nature of the path setpoint will be adapted to the nature of the chosen path parameter.

Thus, the path setpoint may be in the form of a position setpoint of the vehicle, respectively in the form of an orientation setpoint of the vehicle, in a reference frame external to the vehicle when the path parameter is the position, respectively the orientation, of the vehicle, or a yaw speed setpoint when said path parameter is the yaw speed of the vehicle, or even a position setpoint of the power steering (steering angle setpoint) $\theta_{ref}$ when the used parameter is the position θ (the steering angle) of the power steering (in a reference frame internal to the vehicle).

In the following, for convenience, reference will be made more preferably to a path control which uses the position of the power steering (the steering angle) θ as a path parameter, while considering that the invention remains applicable, mutatis mutandis, to any other path control.

For convenience, it is therefore possible to assimilate the notions of path parameter, path setpoint, and path deviation, as well as the corresponding references, to the notions and to the references of position (steering angle) θ, position setpoint $θ_{ref}$ and position deviation Δθ.

Thus, preferably, the driver torque setpoint $C_{steer\_ref}$ which is used during the driver torque control step (b) may be generated during a path control step (a) comprising measuring the effective position θ of the power steering, and then comparing this effective position θ to a position setpoint $θ_{ref}$ which is predetermined depending on a reference path that the vehicle is desired to follow automatically, in order to assess a position deviation Δθ which corresponds to the difference between said position setpoint and the effective position of the power steering: $Δθ=θ_{ref}-θ$ (or conversely, to the difference between the effective position of the steering and the position setpoint: $Δθ=θ-θ_{ref}$, according to the sign convention which, herein again, may be chosen freely), and then determining, from this position deviation Δθ, a driver torque setpoint $C_{steer\_ref}$ intended to reduce said position deviation Δθ; this driver torque setpoint $C_{steer\_ref}$ is the setpoint which is applied afterwards in input of the driver torque control, as indicated above.

According to this preferred variant of implementation, the path control step (a) (also called «position control») corresponds to a follower-type closed-loop control, which uses as a regulation variable the position of the power steering, that is to say a value representative of the steering configuration of the power steering, and which seeks to adapt the action of the assist motor 4 on the steering mechanism 2 (in this instance, to adapt the motor torque $C_{mot}$ indirectly via the driver torque control loop) so as to make the effective position θ of the power steering converge toward the position setpoint $θ_{ref}$ which is set in input of said loop.

It will be noted that, advantageously, and as is visible in FIG. 1, the adaptation of the action of the assist motor 4 by the path control loop is not direct, but passes via the "normal" assist loop constituted by the driver torque control loop.

In other words, the driver torque control loop (b) herein is nested, in the form of a slave regulator, within the path control loop (a), which forms the master regulator.

Thus, the output of the path control module 7 is connected to the input of the driver torque control module 6, and designed so as to emit, not directly, a motor torque setpoint which would interfere with the setpoint derived from the driver torque control module 6, but rather a driver torque setpoint $C_{steer\_ref}$ which will be used (in input) by said driver torque control module 6 in order to determine (in output of said module 6) one (unique) motor torque setpoint $C_{mot\_ref}$ which will be applied afterwards (directly) to the assist motor 4.

It will be noted that the proposed architecture advantageously allows isolating, on the one hand, the way it is desired to incite the driver to follow a given reference path (and in particular to follow his traffic lane), herein by generating (by the path control module 7) a "need" expressed in the form of a driver torque setpoint $C_{steer\_ref}$ which corresponds to what the driver should feel and, on the other hand, the "realization" means which allows fulfilling this need, that is to say which concretely allows obtaining that the driver follows the reference path, herein thanks to the driver torque control provided by the module 6.

Furthermore, as has been indicated above, this architecture specific to the invention allows combining effectively the path control, which depends on an active automatic piloting, with the driver torque control, corresponding to a "conventional" assistance which depends on a manual piloting, by making these distinct functions coexist without having necessarily to selectively inhibit either one of said functions of to deteriorate the performances of either one of said functions.

The (instantaneous) effective position θ of the power steering may be obtained by any measurement by means of an appropriate position sensor, such as for example by a measurement of the linear position of the rack, or even, preferably, by a measurement of the angular position of the steering wheel 3 (also noted «steering wheel angle», in FIG. 2), or even, in an equivalent manner, if the mechanical reduction ratio of the kinematic chain which connects the assist motor 4 to said steering wheel 3 is known, by a measurement of the angular position of the shaft of the assist motor 4.

If appropriate, the angular position of the shaft of the assist motor 4 may be determined by means of a resolver type sensor, preferably integrated to the assist motor.

Of course, more generally, the path parameter(s) θ used to characterize the effective path of the vehicle may be measured by any appropriate means, and where appropriate, may be determined by calculation from one or several other measured data, which are themselves representative of the effective path of the vehicle (and in particular representative of the position, the orientation, or the dynamic behavior of the vehicle at the considered instant).

Thus, the yaw speed may be measured for example by means of an inertial sensor.

Similarly, the position and the orientation of the vehicle with respect to the reference path (in a reference frame external to the vehicle) may be measured from cameras or distance sensors (in particular optical or ultrasonic sensors) capable of measuring the distance of the vehicle with respect to reference points of its environment, such as a pavement marking delimiting the traffic lane, or even by means of a geolocation system (GPS).

The position setpoint $θ_{ref}$ (and more generally the path setpoint) applied at a considered instant will correspond to a target-position, calculated by the steering system, in which the steering mechanism 2 should be placed in order to enable the vehicle, in the life situation thereof, to adopt a steering angle of the steered wheels which allows the vehicle to follow an actual path which gets as closer as possible to (within a predefined tolerance margin), and ideally coincides with, the predetermined reference path.

In other words, the path control function will consist in ensuring an automatic piloting of the vehicle allowing keeping the actual path of the vehicle in the vicinity of the (ideal) reference path, by operating the necessary path corrections (and therefore the position setpoint adjustments) in real-time.

In practice, the position setpoint $θ_{ref}$ (and more generally the path setpoint) will be therefore variable over time, both in sign (left/right) and in intensity (magnitude of the steering angle), depending on the targeted reference path and on the corrections made.

Advantageously, the reference path will be automatically constructed, among others, from data related to external parameters in relation with the environment of the vehicle, such as the distance separating a portion of the vehicle from an external obstacle (for example another parked vehicle) or even the relative position of the vehicle with respect to an external reference, for example with respect to a separation line of the traffic lanes.

These data may be acquired, substantially in real-time, by any appropriate measurement, carried out for example by means of contactless sensors (cameras, optical sensors, ultrasonic sensors, etc.).

The information provided by these data make it possible to determine the situation of the vehicle in its environment (position, orientation, speed, etc.) at the considered instant, and therefore to propose, in a reference frame external to the vehicle, a path (or path corrections) adapted both to said environment, to the dynamic of the vehicle (determined in particular depending on the longitudinal speed, on the forces exerted on the rack and/or on lateral dynamic parameters such as the yaw speed or the lateral acceleration), and, of course, to the targeted automatic piloting operation.

Preferably, during the path control step (a), in order to determine the path setpoint $\theta_{ref}$, and more preferably in order to determine the position setpoint $\theta_{ref}$, it is possible in particular to use an automatic piloting function for parking maneuver (generally known under the name «park assist»), in particular for reverse parking maneuver, and more particularly an automatic piloting function for performing parallel parking, or even an automatic piloting function for following a traffic lane (generally known under the name «lane keeping»).

In a manner known per se, the monitoring of the traffic lane, and therefore the definition (construction) of the reference path (or path corrections) corresponding to the course of said traffic lane, whether said course is moreover straight or curved, may be carried out by means of cameras capable of detecting the limit marking of the traffic lane and measuring the position of the vehicle with respect to said marking.

Preferably, the path control step (a) comprises an output saturation substep (a1), comprising comparing the driver torque setpoint $C_{steer\_ref}$ to a predetermined admissible maximum threshold, called «driver torque saturation threshold» $C_{steer\_MAX}$, and limiting the driver torque setpoint to the value of said driver torque saturation threshold $C_{steer\_MAX}$ if said driver torque setpoint exceeds said saturation threshold.

In other words, we will ensure that the magnitude of the driver torque setpoint $C_{steer\_ref}$ which is effectively applied in input of the driver torque control module 6 shall in no case exceed the saturation threshold $C_{steer\_MAX}$, so as to avoid causing a too strong action of the steering wheel 3 on the arm of the driver.

Advantageously, limiting (capping) the driver torque setpoint guarantees a safe operation of the automatic piloting, which, although present, is not likely to put the driver in danger, or to cause him an injury through an irresistible drag of the arm or of the hand.

Advantageously, the saturation provided by the invention therefore allows preserving the benefit of the path control, while enabling the application of a non-zero driver torque setpoint, perceivable by the driver when the latter holds the steering wheel, and which therefore allows making the driver actively feel a return effect of the steering wheel which tends to guide the maneuver of the steering wheel toward the steering position decided by the path control (that is to say toward the position of the steering which should allow following or joining the reference path), while avoiding however any too strong action which could force the displacement of the steering wheel against the will of the driver.

In other words, the saturation allows the path control function to inform, in a tactile way, the driver of a drift with respect to the reference path, and to make him feel the direction in which, and more particularly the position toward which, he should maneuver the steering wheel in order to return to this reference path, however without this path control preventing nor supplanting a (diverging) manual maneuver of the steering wheel, decided freely by the driver and distinct from the automatic maneuver desired by the path control.

Thus, the operation of the method is both effective and without danger for the driver, whether the latter is holding the steering wheel or has released said steering wheel.

In a particularly preferred manner, the driver torque saturation threshold $C_{steer\_MAX}$ is comprised between 1 N·m and 4 N·m, for example between 2 N·m and 3 N·m.

These values correspond to the torque as felt by the driver, at the steering wheel 3, when the driver holds said steering wheel. Advantageously, said values correspond, in practice, to a force (torque) limit which is acceptable for the major portion of the population, that is to say which remains significantly lower than the muscular capacity of an "average" driver, so that the driver could feel the tactile incitation (where appropriate, limited by saturation) transmitted thereto by the path control, while keeping the freedom, when necessary, to manually maneuver the steering wheel "forcibly" against said path control, without the risk of losing control over the steering wheel and without any excessive fatigue.

According to a possible implementation, the path control may include a PID-type (proportional-integral-derivative) regulator (corrector) for determining the driver torque setpoint from the position deviation $\Delta\theta$.

As a very simple example, a proportional-type regulator may associate to the position deviation $\Delta\theta$ a driver torque setpoint $C_{steer\_ref}$ obtained simply by multiplying said position deviation by a coefficient k which may be assimilated to a (spring-type) stiffness: $C_{steer\_ref}=k*\Delta\theta$.

An integral-type regulator allows reducing the control static error, in a manner known per se.

Figure 2:
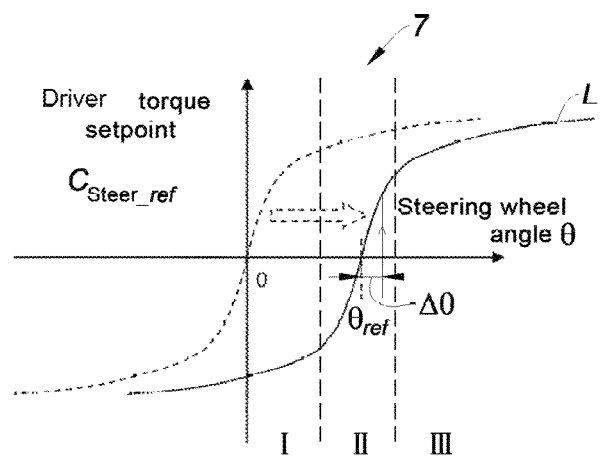
FIG. 2 illustrates an example of the law used for the path control.

Preferably, during the path control step (a), in order to determine the driver torque setpoint $C_{steer\_ref}$ from the path deviation $\Delta\theta$, and more preferably from the position deviation $\Delta\theta$, a driver torque setpoint determination law L is used, which is in the form of a function centered on the path setpoint $\theta_{ref}$, and more preferably centered on the position setpoint $\theta_{ref}$, and which associates to every effective value of the path parameter $\theta$, and more preferably to every effective position value $\theta$ of the steering, and more preferably to every steering wheel angle value representative of the angular position of the steering wheel 3, a corresponding driver torque setpoint $C_{steer\_ref}$, as illustrated in FIG. 2.

Advantageously, centering the driver torque determination law L on the path setpoint (position setpoint) $\theta_{ref}$ corresponding to the reference path, that is to say, graphically, making the function representative of said law L pass through the point of abscissa $\theta_{ref}$ and ordinate $C_{steer\_ref}=0$, allows assimilating the path deviation (the position deviation) $\Delta\theta$ directly to the effective value of the path parameter (value of the effective position) $\theta$.

Thus, said law L allows associating directly to every non-zero position deviation (path deviation) $\Delta\theta$, that is to say to every effective position $\theta$ which does not coincide with the reference position defined by the position setpoint $\theta_{ref}$, a non-zero driver torque setpoint $C_{steer\_ref}$ (and, consequently, indirectly, a non-zero motor torque setpoint $C_{mot\_ref}$), which tends to bring the steering mechanism 2 back toward (or into) said reference position (defined by the position setpoint).

Advantageously, as illustrated by the dotted curve in FIG. 2, the law L may be centered on a zero reference position (position setpoint) $\theta_{ref}$, which may correspond to the midpoint of the power steering, thereby allowing to follow a straight path.

Nonetheless, as illustrated by the solid line curve in FIG. 2, the invention will advantageously enable centering the law L on any non-zero position setpoint $\theta_{ref}$ value (and more generally on any path setpoint) which, where appropriate, will be variable over time and will be refreshed on a periodic basis, substantially in real-time, by the path control module 7.

Hence, the invention offers the possibility to dynamically adjust the law L, so as to (also) ensure following non-straight reference paths, for example for parking assistance or even following a curved traffic lane.

Hence, the method will benefit from a wide versatility, allowing addressing different needs in terms of automatic piloting, by means of the same architecture.

According to a preferred feature which may constitute an invention on its own, and as illustrated in FIG. 2, the function representative of the driver torque setpoint determination law L is a curve called «S-shaped» curve presenting an increasing central domain II, centered on the path setpoint $\theta_{ref}$, and more particularly centered on the position setpoint $\theta_{ref}$, and preferably substantially linear, which is surrounded by two asymptotic domains I, respectively III, having (a) lesser slope(s) than the slope of the central domain II, or even having a substantially zero slope.

Said S-shaped curve, which thus comprises a first asymptotic domain I, followed by a central domain II with an average slope which is more significant than the average slope of said first asymptotic domain I, and then a second asymptotic domain III which follows the central domain II and which presents an average slope lower than the average slope of the latter, will be preferably symmetrical with respect to the point on which said S-shaped curve is centered, that is to say with respect to the point the abscissa of which is equal to the path setpoint (position setpoint) $\theta_{ref}$ (and the ordinate of which is zero).

Said S-shaped curve may be in the form of a regular and continuously differentiable curve, as illustrated in FIG. 2, or even in the simplified form of a broken line associating (contiguously) a line segment with each of the domains I, II, III.

Advantageously, the choice of an S-shaped curve allows including within the same driver torque setpoint determination law L, on the one hand, the path control follower function, which associates to every non-zero path deviation (position deviation) $\Delta\theta$ a non-zero driver torque setpoint $C_{steer\_ref}$ (in particular in the central domain II, which preferably acts according to a proportional law) and, on the other hand, a (gradual) saturation function which allows, in the peripheral asymptotic domains I, III, capping the action of the path control against the driver, and this including when a considerable deviation is created, by the manual action of the driver on the steering wheel 3, between the effective path (effective position) $\theta$ and the path setpoint (position setpoint) $\theta_{ref}$ specified by the path control.

In turn, centering the curve on the path setpoint (position setpoint) $\theta_{ref}$ advantageously provides the aforementioned advantages in terms of automaticity and versatility of the regulation, while allowing following effectively any path setpoint (position setpoint) $\theta_{ref}$, including non-zero setpoint, freely chosen by the path control.

Moreover, it will be noted that the shape of the curve representative of the driver torque setpoint determination law L may be advantageously identical (superposable) either if a straight-line path control is considered, according to which said curve is centered on the origin of the reference ($\theta=0$, $C_{steer\_ref}=0$), or if a control according to any non-zero reference position $\theta_{ref}$ is considered, for example for staying on a curved traffic lane, wherein the curve is centered on said reference position ($\theta_{ref}\neq0$), since a curve may be deduced from the other one by simply translating along the axis of abscissas, as is indicated by the arrow in a dotted line in FIG. 2.

Regardless of the shape thereof, the curve (or the scatter chart) defining the driver torque setpoint determination law L may be informed in the form of a mapping («basemap») stored in the memory, which mapping will be preferably parametrizable, that is to say adjustable, at least depending on the path setpoint value (position setpoint) $\theta_{ref}$, on which said mapping is centered as indicated above.

Where appropriate, other parameters, such as for example the speed of the vehicle, may influence the definition of the law L.

As example, it is possible to provide for a driver torque setpoint $C_{steer\_ref}$ level which is increasingly high as the speed of the vehicle increases (which amounts to stretch the curve of the law L, and therefore the mapping, along the axis of ordinates when the speed of the vehicle increases, and conversely, to "shrink" said curve when the speed of the vehicle decreases and/or is below a predetermined threshold).

Of course, the invention also concerns, as such, a data medium readable by a computer and containing computer program code elements ensuring the execution of a method according to any one of the features described in the foregoing when said medium is read by a computer.

The invention also concerns a power steering management module comprising a driver torque control module 6, which receives in input, on the one hand, a driver torque setpoint $C_{steer\_ref}$ and, on the other hand, a measurement of the effective driver torque $C_{steer}$ which is actually exerted, at the considered instant, by the driver on the steering wheel 3, which assesses a driver torque deviation $\Delta C_{steer}$ which corresponds to the difference between the effective driver torque $C_{steer}$ and said driver torque setpoint $C_{steer\_ref}$, and which provides, in output, depending on said driver torque deviation, a motor torque setpoint $C_{mot\_ref}$ intended to be applied to the assist motor 4 in order to reduce said driver torque deviation $\Delta C_{steer}$, said management module also comprising a path control module 7 which receives, in input, a path setpoint $\theta_{ref}$ which is predetermined depending on a reference path that the vehicle is desired to follow automatically, as well as a measurement of the effective value $\theta$ of at least one parameter called «path parameter», which is representative of the effective path of the vehicle, and then which assesses a path deviation $\Delta\theta$ which corresponds to the difference between said path setpoint $\theta_{ref}$ and the effective value of the path parameter $\theta$, and then which provides, in output, connected to the corresponding input of the driver torque control module 6, a (the) driver torque setpoint $C_{steer\_ref}$ determined from the path deviation $\Delta\theta$ and intended to reduce said path deviation.

More preferably, the path control module 7 receives, in input, a position setpoint $\theta_{ref}$, which is predetermined depending on the reference path that the vehicle is desired to follow automatically, as well as a measurement of the effective position $\theta$ of the power steering, and then assesses a position deviation $\Delta\theta$ which corresponds to the difference between said position setpoint $\theta_{re}$ and the effective position $\theta$ of the steering, and then provides, in output, connected to the corresponding input of the driver torque control module

6, a (the) driver torque setpoint $C_{steer\_ref}$ determined from the position deviation $\Delta\theta$ and intended to reduce said position deviation.

Of course, the driver torque control module 6 being placed and used as a slave relative to the path control module 7, the driver torque control has to be sufficiently rapid in order to take into consideration and to execute the different driver torque setpoints $C_{steer\_ref}$ which are transmitted thereto by the path control module 7 over time.

This is why the bandwidth of the driver torque control loop will be higher (typically by at least three times, and preferably ten times) than the bandwidth of the path control loop, that is to say the response time of the driver torque control module 6, for elaborating the motor torque setpoint $C_{mot\_ref}$ and bringing the assist motor 4 to apply an effective motor torque $C_{mot}$ close to this setpoint (typically with an error fewer than 5%), will be at least three, and preferably ten times shorter than the time which is necessary for the path control module 7 to refresh the driver torque setpoint $C_{steer\_ref}$.

Moreover, each of the aforementioned modules 6, 7 may be formed by an electronic circuit, an electronic board, a calculator (computer), a programmable logic controller, or any other equivalent device.

Each of said modules 6, 7 may present a physical control structure, obtained by the wiring arrangement of its electronic components and/or, preferably, a virtual control structure, defined by computer programming.

Furthermore, the invention also concerns, of course, a power steering system comprising a power steering mechanism piloted by a management module including all or part of the aforementioned modules 6, 7, and therefore capable of implementing the method according to the invention.

Finally, the invention concerns a motor vehicle, in particular with steered, possibly drive, wheels equipped with such a power steering system.

Of course, the invention is in no way limited to the sole variants described in the foregoing, those skilled in the art being in particular capable of freely isolating or combining together either one of the aforementioned features, or even substituting them with equivalents.

In particular, as indicated above, the invention concerns any method for managing a power steering within which a driver torque control function (assist function) and a path control function (automatic piloting function) are combined so that the output of the path control function serves as a driver torque setpoint to the driver torque control function (that is to say that the output of the path control function serves as a target-value of the driver torque, toward which the assist function will then seek to make the effective value of the driver torque converge, by generating and by applying an appropriate control to the assist motor).

The invention claimed is:

1. A method for managing a power steering for a vehicle, the power steering including at least one steering wheel and at least one assist motor, the method comprising:
 a driver torque control step, which is a driver torque control closed loop, the driver torque control step comprising:
  measuring an effective driver torque that is actually exerted by a driver on the steering wheel,
  comparing the effective driver torque with a predetermined driver torque setpoint in order to assess a driver torque deviation that corresponds to a difference between the effective driver torque and the driver torque setpoint, and
  determining from the driver torque deviation a motor torque setpoint intended to be applied to the assist motor in order to reduce the driver torque deviation,
 wherein the predetermined driver torque setpoint is generated during a path control step, which is a path control closed loop, the path control step comprising:
  measuring an effective value of at least one path parameter, which is representative of an effective path of the vehicle, and
  comparing the path parameter with a path setpoint, which is predetermined depending on a reference path that the vehicle automatically follows, in order to assess a path deviation that corresponds to a difference between the path setpoint and the effective value of the path parameter, and then determining, from the path deviation, the driver torque setpoint,
 wherein the path control closed loop and the driver torque control closed loop are nested in series.

2. The method according to claim 1, wherein, during the path control step, an effective position of the power steering is measured, and then the effective position is compared with a position setpoint, which is predetermined depending on the reference path that the vehicle automatically follows, in order to assess a position deviation that corresponds to a difference between the position setpoint and the effective position of the power steering, and from the position deviation, the driver torque setpoint is determined.

3. The method according to claim 1, wherein the path control step further includes comparing the driver torque setpoint with a predetermined driver torque saturation threshold and limiting the driver torque setpoint to the value of the predetermined driver torque saturation threshold if the driver torque setpoint exceeds the predetermined driver torque saturation threshold.

4. The method according to claim 3, wherein the predetermined driver torque saturation threshold is between 1 N·m and 4 N·m.

5. The method according to claim 1, wherein the path control step further includes using a driver torque setpoint determination law, in order to determine the driver torque setpoint from the path deviation, wherein the driver torque setpoint determination law is in the form of a function centered on the path setpoint, and associates to every effective value of the path parameter, a corresponding driver torque setpoint.

6. The method according to claim 5, wherein the function that is representative of the driver torque setpoint determination law is an S-shaped curve presenting an increasing central domain that is centered on the path setpoint, wherein the increasing central domain is surrounded by two asymptotic domains with a slope that is lesser than the slope of the central domain, or with a slope that is substantially zero.

7. The method according to claim 1, wherein the path control step further includes using an automatic piloting function for parking maneuver or an automatic piloting function for following a traffic lane, in order to determine the path setpoint.

8. A non-transitory data medium readable by a computer and containing computer program code elements ensuring the execution of a method according to claim 1 when the medium is read by a computer.

9. A power steering management system comprising:
 non-transitory computer executable instructions; and
 a processor configured to execute the non-transitory computer executable instructions to cause the processor to:

perform a driver torque control step, which is a driver torque control closed loop, the driver torque control step comprising:
  receiving as an input a driver torque setpoint and a measurement of an effective driver torque that is actually exerted by the driver on the steering wheel,
  determining a driver torque deviation that corresponds to a difference between the effective driver torque and the driver torque setpoint, and
  providing as an output a motor torque setpoint based upon the driver torque deviation, the motor torque setpoint being intended to be applied to the assist motor in order to reduce the driver torque deviation,
wherein the predetermined driver torque setpoint is generated during a path control step, which is a path control closed loop, the path control step comprising:
  measuring an effective value of at least one path parameter, which is representative of an effective path of the vehicle, and
  comparing the path parameter with a path setpoint, which is predetermined depending on a reference path that the vehicle automatically follows, in order to assess a path deviation that corresponds to a difference between the path setpoint and the effective value of the path parameter, and then determining, from the path deviation, the driver torque setpoint,
wherein the path control closed loop and the driver torque control closed loop are nested in series.

10. The power steering management module according to claim 9, wherein during the path control step, an effective position of the power steering is measured, and then the effective position is compared with a position setpoint, which is predetermined depending on the reference path that the vehicle automatically follows, in order to assess a position deviation that corresponds to a difference between the position setpoint and the effective position of the power steering, and from the position deviation, the driver torque setpoint is determined.

* * * * *